Patented Aug. 23, 1927.

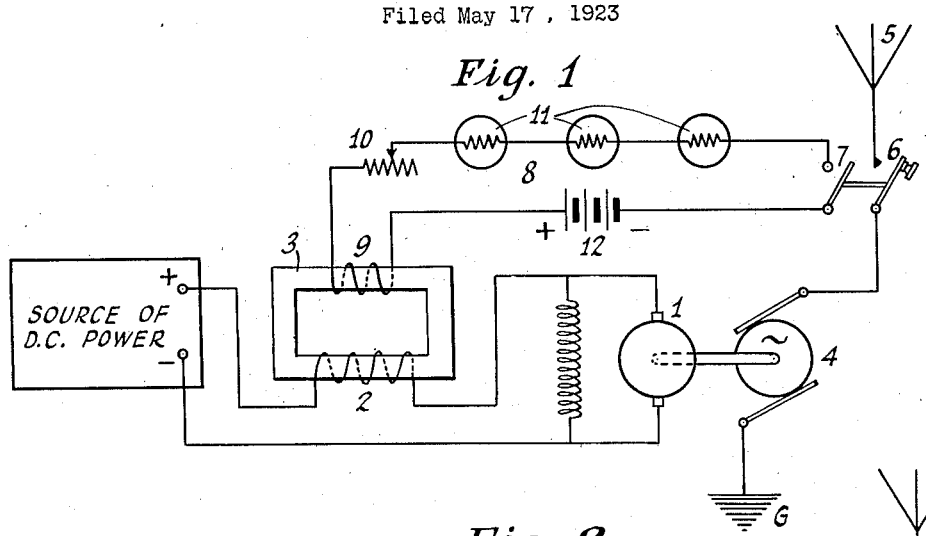
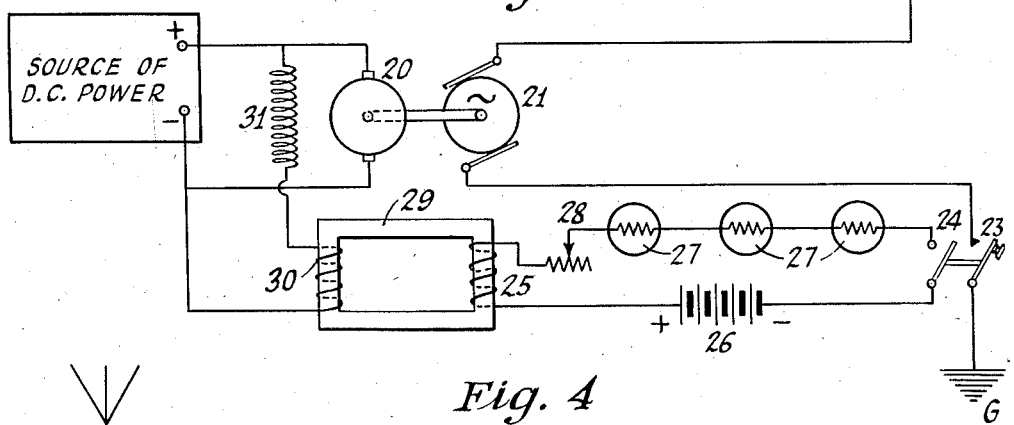
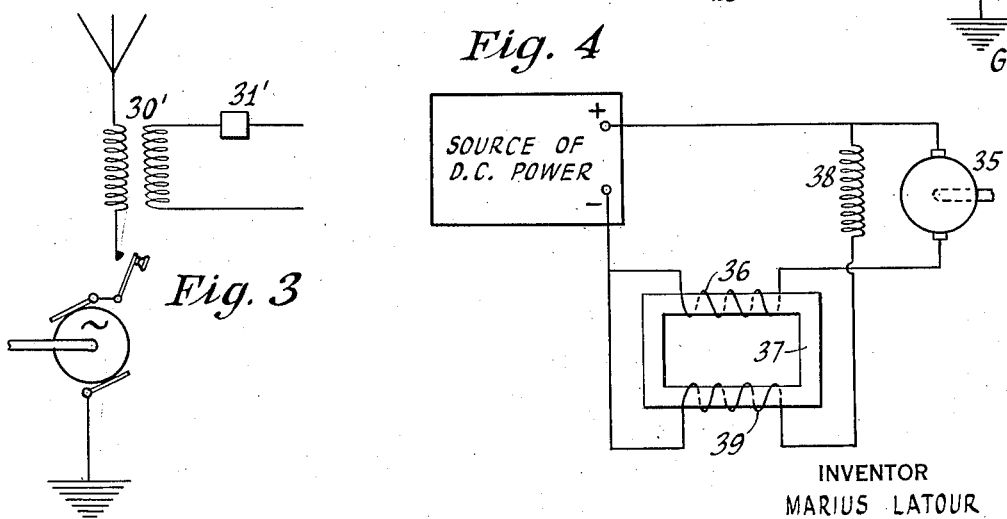

1,640,002

UNITED STATES PATENT OFFICE.

MARIUS LATOUR, OF PARIS, FRANCE, ASSIGNOR TO LATOUR CORPORATION, OF JERSEY CITY, NEW JERSEY, A CORPORATION OF DELAWARE.

SPEED REGULATOR FOR HIGH-FREQUENCY GENERATING SETS.

Application filed May 17, 1923, Serial No. 639,707, and in France June 19, 1922.

The invention relates to an arrangement adapted to the acceleration at will of the variations in working state of D. C. machines, especially in D. C. motors adapted to the driving at very constant speeds of high-frequency alternators of the kind used in wireless work.

It is well known that the operation or manipulation of the key in the aerial circuit of a high-frequency alternator causes sudden throwing on and off of the load on the D. C. motor serving to drive the alternator. In reality, if the motor does not immediately take the armature current corresponding to the load of the alternator, the speed of the motor varies from the viewpoint of instantaneous value, and if the effects due to mechanical inertia are insufficient compared with the variations of the couple on torque in action, the regulation of the set is rendered unsatisfactory. Now, in order that the armature current may be caused to assume a normal state rapidly, one may usefully control, by the same manipulation, the excitation of the generator feeding the motor in such a manner as to cause modifications in the voltage of the feeding current (D. C.) at the very instant where such manipulation occasions a variation in the couple, similarly as, also by the same manipulation, it is possible to modify the value of a resistance or of a self-induction coil (reactor) arranged in series with the armature or the field of the motor. However, even by the adoption of the said means, as a consequence of the "self-reactance" inherent in the circuits carrying D. C., the electric state for the flow of D. C. necessary for balancing of couples is not established immediately as is true of the H. F. power. Whence it follows that perceptible speed variations are always a matter to be feared in the case of light alternators of high specific power and high efficiency, especially if the speed of manipulation is comparatively low.

Now, in order to obviate this serious difficulty, and to expedite as much as feasible the establishment of the normal state of the D. C. in the motor, in fact, make it as rapid as that of the high-frequency current of the alternator, the invention provides the following very simple arrangement.

The armature current of the motor flows through the first winding of a regular transformer comprising a laminated magnetic circuit whose second winding may be fed independently from a D. C. source, possibly by the same source that feeds the motor. As long as this second winding is open-circuited, conditions undoubtedly are wholly the same as if one had simply inserted a "self-reactor" in the circuit, and the core of the transformer is magnetized by the armature current. But if D. C. is sent through the second winding of the transformer, and in a sense so that it will tend to demagnetize the core of the device, there will immediately be caused from the viewpoint of instantaneous values, a growth of the armature current. Moreover, if with this auxiliary current being established one suppresses at once the current by discontinuing entirely the feeding and supply of the second winding, there will be caused a diminution of the armature current. Although the supply of this second winding controlled by the operating key or switch of the antenna circuit may not be shown here, it will readily be understood that one accelerates at will the variations of the armature current in accordance with the value of the transformer and the value assumed for the auxiliary current. The effectiveness of the arrangement is solely subject to the rapid establishment of this auxiliary current sent by the switch through the second winding. But one may proceed in a way so that by arranging in series a regulable resistance and by applying an adequate voltage comparatively with the member of turns of this winding, the establishment of the current therein may be as sudden as may be desired and necessary.

In practice, the resistance provided in series with the second winding is preferably of the metallic kind (for instance, made of iron) and in the shape of lamps, in order that it may attain its maximum magnitude only after having become heated, that is, a little after depressing the operating key. In this manner it is feasible to apply to the winding a relatively higher voltage, or else to diminish the number of necessary turns.

What has been stated respecting the armature circuit holds good likewise of the field circuit; and the identical arrangement of a transformer with two windings of which one is traversed by the current of the field, and the other by an auxiliary current controlled by the operating key, permits of accelerating at will the variation in the state of excitation. Of course, one could also think of combining these two transformers into one.

The second winding or auxiliary winding, instead of being fed through action of the operating key from a local source of D. C. supply could also be fed directly by the rectified antenna current (for instance, by the aid of a cathode-ray rectifier).

It must be noted that in the case of rectification of this sort it is possible to make the rectified aerial current to participate in the excitation of the motor or the generator supplying such motor. The change in excitation state, under such condition, would then occur absolutely at the same time where the antenna current puts in an appearance, or where it disappears. There could then exist a certain excess of voltage with regard to the rectifier, but it would be an easy thing to adopt measures adequate to this end.

Instead of rectifying the aerial current, it could be brought to act upon the D. C. circuits through the intermediary of an electromagnet possessing a magnetic circuit built up of very thin laminations and which could be fed directly.

It may be noticed that for no-load working and continuous load running, conditions with reference to the transformer forming the subject-matter of this invention are the same as if self-reactors had simply been inserted in the circuits of the motor. This circumstance is essentially favorable for the elimination of tendencies to hunting that would be apt to be caused by the operation of the regulator which might be provided in the generating set, seeing that the self-reactances naturally insure constancy of the D. C. and of the corresponding couples.

An additional scheme would be to establish mutual induction through a transformer between the armature and excitation circuit. in such a manner that the armature current will show a tendency to vary in a sense inverse with relation to that of the exciting current of the motor. Such an arrangement would be extremely promotive of stability and would moreover facilitate regulation.

The D. C. motor and the D. C. generator which it supplies, be it well understood, could comprise outside shunt excitation, any additional or subtractive series excitation simultaneously with compensation windings.

A better understanding of my invention can be had from the following description taken in connection with the accompanying drawings in which:

Fig. 1, is a schematic diagram of one modification of the invention,

Fig. 2, is a schematic diagram of another modification of my invention and,

Figs. 3 and 4, are schematic diagrams of still further modifications.

Referring to Fig. 1 a direct current shunt motor 1 is connected across a source of D. C. power through a coil 2 mounted on a laminated magnetic core 3. The motor 1 is arranged to drive the alternating current generator 4, one terminal of which may be connected to ground and the other terminal to an antenna 5 through a normally open-circuited keying device 6.

The keying device 6 actuates auxiliary contacts 7 for opening and closing an auxiliary circuit 8 substantially simultaneously with the opening and closing of the antenna circuit. The auxiliary circuit 8 comprises a coil 9 mounted on the core 3, a variable rheostat 10, a plurality of hot wire resistances 11, auxiliary contacts 7 and a source of direct current power 12, all connected in series as shown. The coil 9 is so arranged on the core 3 with respect to the coil 2 that its ampere turns oppose the ampere turns of coil 2.

When it is desired to transmit a signal, the key 6 is pressed downward to thereby effect energization of the antenna 5. The auxiliary contacts 7 are substantially simultaneously closed resulting in a rush of direct current through coil 9. The transient ampere turns exerted by the coil 9 not only neutralize the transient ampere turns set up by the coil 2 due to the rush of current in the armature of motor 1, but also exert additional ampere turns which sends flux through core 3 in such a direction as to induce transient electromotive forces in the coil 2 which add to the electromotive forces of the source of direct current power to thereby effect an increase in speed of the motor 1.

When the key 6 is opened, auxiliary contacts 7 also open. The decay of current in the auxiliary circuit 8 tends to slow the motor 1 down when the load is thrown off. In this way the speed of the motor 1 is maintained substantially constant irrespective of the load. The hot wire resistances 11, whose resistances do not attain their maximum values until the expiration of a few instants after the closure of the auxiliary contacts 7, serve to decrease the flow of current in the coil 9 after the expiration of a few instants of time.

Referring to Fig. 2, a direct current motor 20 is connected across a source of direct current power as shown. This motor drives an alternating current generator 21, one terminal of which is connected to an antenna 22 the other terminal of which is connected to ground through a keying device 23. The keying device 23 normally open-circuits the antenna 22 and is associated with auxiliary contacts 24 which are normally open when the antenna circuit is open and closed when the antenna circuit is closed. The auxiliary contacts 24 control the energization or de-energization of an auxiliary circuit comprising a coil 25, a source of direct current power 26, a plurality of hot wire resistances 27, and a variable rheostat 28 all connected in series across the said auxiliary contacts.

The coil 25 is mounted on a laminated magnetic core 29 together with a coil 30. The coil 30 is connected in series with the shunt field 31 of the direct current motor 20, the shunt field 31 and the coil 30 being connected across the armature of motor 20.

The coils 25 and 30 are so arranged on the magnetic core 29 as to result in transient electromotive forces being induced in the coil 30 by the magnetic flux set up by the coil 25, these transient electromotive forces being in such a direction as to oppose the electromotive force of the source of direct current power.

When the keying device 23 is closed, a load is immediately thrown on the alternating current generator 21. The resulting demand for torque from the direct motor 20 results in an initial rush of current to the said motor with a consequent tendency to slow down. Upon the closure of the keying device 23 the auxiliary contacts 24 are also closed. A rush of current from the direct current source of power 26 through the coil 25 results. The transient ampere turns exerted by the coil 25 will immediately induce transient electromotive forces in the coil 30 in such a direction as to decrease the energization of the shunt field winding 31. This decrease in energization results in a decrease in flux with a consequent increase in the speed of the motor 20 back to normal.

When the load is thrown off, the decay of current in the auxiliary circuit tends to slow the motor down. It is of course understood that this phenomenon takes place very rapidly, the speed regulating apparatus actually anticipating a change in speed and establishing conditions of such a nature as to prevent any material change in speed. The hot wire resistances 27 serve the same purpose in connection with the system disclosed in Fig. 2 as they do in Fig. 1.

Referring to Fig. 3, the coils 9 and 25 of Figs. 1 and 2 respectively may be energized directly from the antenna circuit by means of the transformer 30 and a rectifying device 31.

Referring to Fig. 4, the direct current motor 35 is connected across a source of direct current power through a coil 36 mounted on a laminated magnetic core 37. A shunt field winding 38 is connected across the terminals of the armature through a coil 39 mounted on the core 38. The direct current motor 35 may supply a variable load. The coils 36 and 39 are so arranged on the core 37 as to result in the addition or substraction of their transient ampere turns depending on whether the motor is loaded or unloaded. When a load is thrown on the motor 35 an initial rush of current will take place resulting in transient ampere turns being exerted by the coil 36. These transient ampere turns will induce transient electromotive forces in the coil 39. These induced transient electromotive forces will oppose the electromotive forces across the armature terminals of the motor 35. A decrease in energization of the shunt field winding 38 with a consequent increase in the speed of the motor 35 back to its desired value will result. A decrease in armature current will result in a decrease in speed back to normal speed.

While I have shown and described various preferred modifications of my invention, I do not limit myself to the same but may employ such other embodiments as come within the spirit and scope of my invention.

Having described my invention, what I claim is:

1. In combination with a transmission circuit, a dynamo coupled to said transmission circuit, a motor for driving said dynamo, a control circuit for said motor, means for varying the current introduced into said transmission circuit by said dynamo to send a signal, and means for controlling the speed of said dynamo comprising means for impressing transient electromotive forces in said control circuit in response to the operation of said first mentioned means.

2. In combination with a transmission circuit, a dynamo coupled to said transmission circuit, a motor for driving said dynamo, a control circuit for said motor, means to vary the current in said transmission circuit, and means actuated by said first means for impressing electromotive forces on said control circuit to control the speed of said motor.

3. In a transmission system, a motor, a generator driven by said motor, a power circuit for said motor, a coil in said power circuit, a second circuit having a source of current, one or more units of resistance which vary with temperature and a coil therein, said coils being coupled in opposition, means for varying the load on the generator, and means operable simultaneously with said first means to close said second circuit.

4. In combination with a transmitting circuit, a high frequency generator coupled to said transmission circuit, keying means for varying the current of said generator in said transmission circuit, a motor for driving said generator, a source of power, a control circuit connecting said source of power and said motor, a second control circuit having a source of direct current and one or more thermal resistances therein, a switch in said second control circuit, said keying means being operatively connected to said switch whereby the operation of said keying means is effective to vary the flow of current in said second control circuit, and two coils differentially wound on a common core, one of said coils being included in said control circuit and the other coil being included in the second control circuit.

MARIUS LATOUR.